United States Patent [19]

Zachrai

[11] Patent Number: 5,422,436
[45] Date of Patent: Jun. 6, 1995

[54] CONTROL CABINET

[75] Inventor: Jürgen Zachrai, Dillenburg-Nanzenbach, Germany

[73] Assignee: Rittal-Werk Rudolf Loh GmbH & Co., Germany

[21] Appl. No.: 26,456

[22] Filed: Mar. 3, 1993

[30] Foreign Application Priority Data

Mar. 7, 1992 [DE] Germany .................. 42 07 281.6

[51] Int. Cl.⁶ .................. H02G 3/18; H02G 15/013
[52] U.S. Cl. .................. 174/65 R; 174/152 G; 174/153 G; 248/56
[58] Field of Search .............. 174/65 R, 49, 59, 65 G, 174/151, 152 G, 153 G, 153 R; 248/56

[56] References Cited

U.S. PATENT DOCUMENTS 5,170,008 12/1992 Evans et al. .......... 174/656 X
5,170,017 12/1992 Stanevich et al. ........ 174/153 G
5,280,132 1/1994 Clarey et al. .......... 174/65 R X

FOREIGN PATENT DOCUMENTS 2036976 2/1972 Germany .......... 174/65 R
2557330 7/1977 Germany .
2633187 1/1978 Germany .......... 174/65 G
7816729 9/1978 Germany .

Primary Examiner—Gerald P. Tolin
Assistant Examiner—Paramita Ghosh
Attorney, Agent, or Firm—Speckman, Pauley & Fejer

[57] ABSTRACT

A control cabinet with an open bottom, which is enclosed by legs of a frame and can be closed off by individual bottom plates which can be placed side-by-side. The individual bottom plates rest with their short sides on a support shoulder of the facing frame legs and are connected with these frame legs. The bottom plates have an edge that is twice bent along at least one long side, wherein sealing strips seal the abutting long sides of adjacent bottom plates and where cables are introduced through cutouts in the bottom. Individual insertion and assured sealing of the individual cables, together with extensive adaptation and expansion possibilities is achieved with at least a portion of the bottom plates having cutouts spaced along the long side with the edge. Cable bushings which have stepped, offset bushing pieces with different interior diameters are insertable into the cutouts.

13 Claims, 3 Drawing Sheets

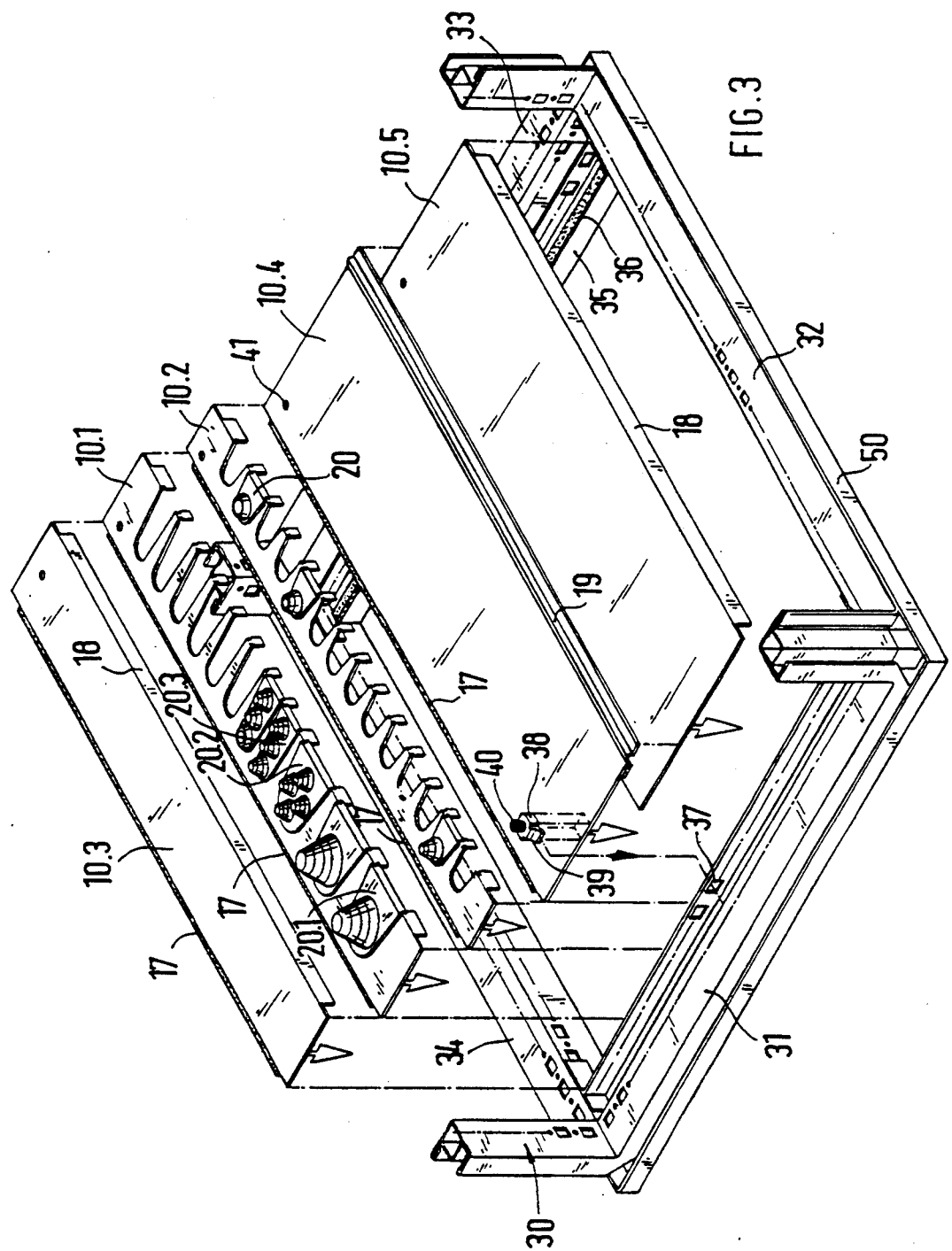

CONTROL CABINET

BACKGROUND OF THE INVENTION

1. Field of the Invention

This invention relates to a control cabinet with an open bottom, which is enclosed by the legs of a frame and can be closed off with individual bottom plates which can be positioned side-by-side. The individual bottom plates rest with their narrow sides on a support shoulder of facing frame legs and are connected with these frame legs, wherein the bottom plates are twice bent along at least one long side. Sealing strips seal the abutting long sides of adjacent bottom plates and cables are introduced through cutouts in the bottom.

2. Description of Prior Art

A conventional control cabinet with a cable inlet is known from German Patent Publication DE 78 16 729 U1. The individual bottom plates have a beveled edge on their long sides facing each other, on which a plastic foam block is positioned. The adjoining bottom plates are placed next to each other in such a way that the plastic foam blocks tightly seal the separating gap between the adjacent bottom plates. The cables are introduced between the two plastic foam blocks, which deform. If cables with greatly differing diameters are introduced side-by-side, the two plastic foam blocks no longer effectively seal the separating gap and the inserted cables.

According to German Patent Publication 25 57 330 A1, cable bushings can be secured in a cutout and have stepped, offset bushing pieces of various diameters which are normally closed. In this case, the number of bushing pieces determines the number of cables with corresponding exterior diameters which can be sealingly routed through this cable bushing. The bushing pieces with respectively narrower interior diameters are cut off the cable bushing. The cable bushing consists of resilient plastic or rubber and the interior diameters of the bushing pieces are in each case somewhat narrower than the exterior diameters of the associated cables in order to obtain a sealed cable fit.

SUMMARY OF THE INVENTION

It is one object of this invention to provide a cable entry in a bottom of a control cabinet similar to the above identified type, but in such a way that it is possible to route a plurality of different cables sealingly into the control cabinet wherein it is easy to adapt to the cable diameters and accommodate additional cables.

In accordance with this invention, the above object is achieved in that at least a portion of the bottom plates has cutouts spaced along one long side at an edge and that cable bushings which have stepped, offset bushing pieces with different interior diameters can be inserted into the cutouts.

The bottom of the control cabinet is closed off with an appropriate number of bottom plates that accommodate cable bushings, as required. The cutouts in the bottom plates receive a plurality of cable bushings which may be shaped the same or differently. Each introduced cable is individually inserted in an appropriate cable bushing and therefore is tightly sealed.

In accordance with one preferred embodiment of this invention, introduction of the cable bushings into the cutouts is simplified in that the cable bushings, which have a groove extending over the portal-like side, are formed on a portal-like base plate and that the edge pieces of the bottom plates remaining between the portal-like cutouts have receiving grooves on both sides which mate with the underside of the bottom plate.

In one preferred embodiment of this invention, the design can be such that identical cutouts are provided at regular intervals in a bottom plate into which identical base plates with identical or varied cable bushings can be inserted. In another preferred embodiment, cutouts of different sizes are provided in a bottom plate and different cable bushings can be inserted into the cutouts in order to obtain a great variety in the selection of cable bushings.

In this case the possibility for variation can be increased in that a base plate insertable into the cutout has several cable bushings with identical, or different bushing pieces.

In the shipping state, all cutouts of all bottom plates are equipped with cable bushings in which the smallest bushing piece is closed.

Fixing of the bottom plates in the control cabinet can be accomplished such that bores, welded-on bolts or welded-on flat ground plugs are provided in the area of the narrow sides for grounding the bottom plates with or without cutouts. The bores are also used as fastening bores for screwing the bottom plates to the facing frame legs of the frame. Also, a nut element with a securing shoulder can be inserted in a fastening receptacle of the facing frame leg and a tensioning bolt screwed into the nut element can be supported on the bottom plate to clamp it against the support shoulder.

This invention will be described in detail by one preferred embodiment illustrated in the drawings.

BRIEF DESCRIPTION OF THE DRAWINGS

FIG. 3 is a perspective partial view of the bottom of a control cabinet with the bottom plates positioned for covering.

DESCRIPTION OF PREFERRED EMBODIMENTS

Figure 1:
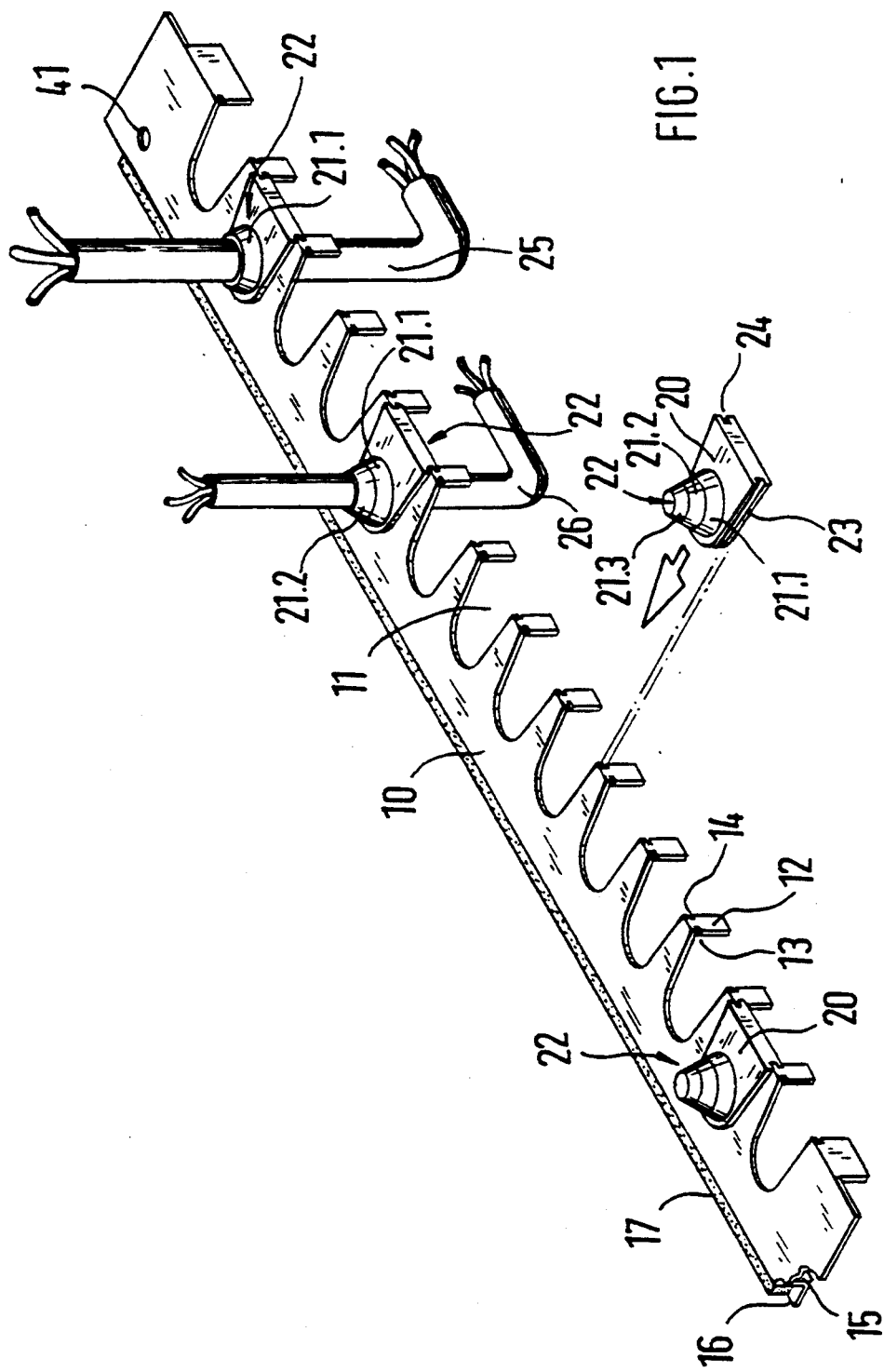
FIG. 1 is a perspective view of a bottom plate with identical cutouts for identical cable bushings.

An elongated bottom plate 10 is illustrated in FIG. 1, which is twice bent on the one long edge as shown by sections 15 and 16. The horizontal section 16 is used as support for an adjoining bottom plate 10, and a sealing strip is provided on the vertical section 15. Identical, portal-like recesses 11 are provided at equal distances on the opposite long side and continue beyond the corresponding long edge, so that only edge sections 12 remain between the cutouts 11. These edge sections 12 have receiving grooves 13 and 14 on both sides adjacent to the underside of the bottom plate 10. The bottom plate 10 is first stamped and then appropriately bent into a desired shape.

Identical cable bushings 22 with a base plate 20 can be inserted into the recesses 11. The portal-like base plate 20 has a groove extending along the portal-like side as shown in the groove sections 23 and 24, so that it can matingly receive the edge around the portal-like recess 11. The cable bushing 22 is formed on the base plate 20 and has bushing pieces 21.1, 21.2 and 21.3, the interior diameters of which are offset. The bushing piece 21.3 having the smallest diameter is preferably closed at the top. The interior diameters of the bushing pieces 21.1, 21.2 and 21.3 are a little smaller than the associated exterior cable diameters. Since the cable bushing 22 is constructed of resilient plastic or rubber, the introduced cable is effectively sealed. If the bushing piece 21.3 is cut off, an appropriately sized cable 26 can be sealingly introduced. However, if the bushing pieces 21.2 and 21.3 are cut off, it is possible to sealingly introduce a cable 25 with a correspondingly larger exterior diameter in a sealing manner. The bottom plate 10 can have fastening bores 41 in the area of the short sides, so that it can be secured or screwed to the frame of the control cabinet.

Figure 2:
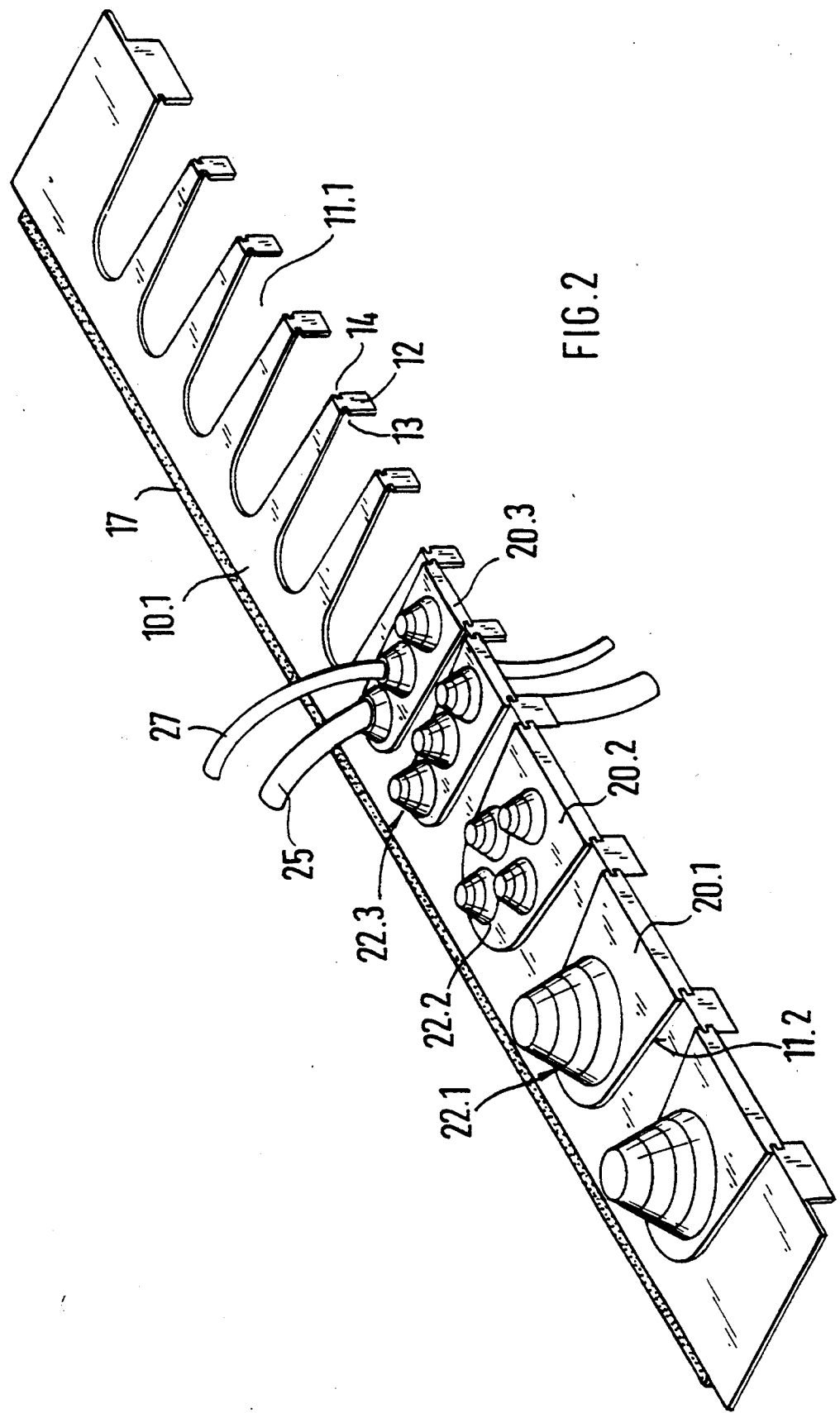
FIG. 2 is a perspective view of a bottom plate with different cutouts for different cable bushings.

The bottom plate 10.1 shown in FIG. 2 is somewhat wider and has portal-like cutouts 11.1 and 11.2 of different width and greater depth than the cutouts 11 of the bottom plate 10 shown in FIG. 1. It is possible to insert cable bushings 22.1 with a base plate 20.1 or cable bushings 22.2 with a plurality of, for example four, cable bushings 22.2 into the cutouts 11.2. The larger cable bushings 22.1 have four bushing pieces for example, while the smaller cable bushings 22 only have three bushing pieces. Base plates 20.3 with three cable bushings 22.3 disposed behind each other are inserted into the recesses 11.1. Cables of different thickness can be sealingly inserted into a recess 11 by cutting off a different number of bushing pieces, as shown by the cables 25 and 27.

FIG. 3 shows the lower portion of a frame 30. The frame legs 31, 32, 33 and 34 form a lower frame which encloses and forms the open bottom of the control cabinet. The frame legs 31 and 33 form a horizontal inward oriented support shoulder 35 on which a sealing strip 36 is positioned. The bottom plates 10 and 10.1 with their cable bushings and the normal bottom plates 10.3, 10.4 and 10.5 without recesses or cable bushings rest with their short sides on this support shoulder 35 and can be secured or screwed together with the frame legs 31 and 33, as indicated by the fastening bores 41. However, fastening of a bottom plate, for example 10.4, can be achieved with a nut element 38, which is inserted with a support shoulder 39 into a fastening receptacle 37 of the facing frame leg, for example 31. The tensioning bolt 40 which is screwed into the nut element 38 is supported on the bottom plate, for example 10.4, and clamps it against the support shoulder 35.

The bottom plates 10.1 and 10.2 adjoin the bottom plate 10.3, which makes a seal by means of the sealing strip 17 against the frame leg 34 and which has a continuous edge 18 facing the bottom plate 10.2. A sealing strip 17 is positioned on the facing long side of the bottom plate 10.1, which makes a seal against the edge 18 of the bottom plate 10.3. The sealing strip 17 of the bottom plate makes a seal against the long side of the bottom plate 10.1 which has cutouts and inserted cable bushings. The sealing strip 17 on the bottom plate 10.4 provides the seal against the long side of the bottom plate 10.2 having the cutouts and inserted cable bushings. With its covering edge 19, the bottom plate 10.4 covers the bottom plate 10.5 and a sealing strip can also be disposed in the area of overlap. The edge 18 of the bottom plate 10.5 makes a seal against the frame leg 32, and a sealing strip can also used for this arrangement.

Additional bottom plates 10.2 or 10.1 can be used in place of the bottom plate 10.4 for covering the bottom of the control cabinet if the number of the cable bushings in the bottom plates 10.2 and 10.1 is insufficient. In the shipping state, the bottom plates 10.2 and 10.1 are fully equipped with closed cable bushings, so that the differently sized cables can be arbitrarily inserted at the place where they are to be used.

I claim:

1. In a control cabinet having a plurality of legs of a frame forming an open bottom which can be closed off by individual bottom plates positioned side-by-side, the improvement comprising: short sides of each of the bottom plates resting on a support shoulder of facing frame legs and connected to the frame legs, the bottom plates having a first long side and a second long side, the first long side having a twice bent edge, said twice bent edge formed by a horizontal section connected to a vertical section, a sealing strip positioned on said vertical section, said sealing strip sealing an abutting long side of an adjacent bottom plate, a plurality of cables introduced through corresponding cutouts in the bottom plates;

at least one of the bottom plates (10, 10.1) having the cutouts (11, 11.1, 11.2) spaced along an edge of the second long side, and a plurality of cable bushings (22, 22.1, 22.2, 22.3) which have stepped, offset bushing pieces (21.1, 21.2, 21.3) with different interior diameters, the offset bushing pieces (21.1, 21.2, 21.3) being insertable within the cutouts (11, 11.1, 11.2).

2. In a control cabinet in accordance with claim 1, wherein the cable bushings (22, 22.1) are formed on a portal-like base plate (20, 20.1, 20.2, 20.3) which has a groove (23, 24) extending over a portal-like side; and edge pieces (12) of the bottom plates (10, 10.1) remaining between the portal-like cutouts (11, 11.1, 11.2) have receiving grooves (13, 14) on both sides which adjoin an underside of each of the bottom plates (10, 10.1).

3. In a control cabinet in accordance with claim 2, wherein the cutouts (11) are identical and are positioned at regular intervals in the bottom plate (10) into which the identical base plates (20) with the cable bushings (22) are insertable.

4. In a control cabinet in accordance with claim 2, wherein the cutouts (11.1, 11.2) are differently sized and are positioned in the bottom plate (10.1), and the differently sized cable bushings (22.1, 22.2, 22.3) are insertable within the cutouts (11.1, 11.2).

5. In a control cabinet in accordance with claim 4, wherein each of the base plates (20.2, 20.3) is insertable into the cutout (11, 11.1, 11.2) and has a plurality of cable bushings (22.2, 22.3) with the bushing pieces.

6. In a control cabinet in accordance with claim 5, wherein the cutouts (11, 11.1, 11.2) of all of the bottom plates (10, 10.1) are equipped with cable bushings (22, 22.1, 22.2, 22.3) in which a smallest bushing piece is closed.

7. In a control cabinet in accordance with claim 6, wherein the bottom plates (10, 10.1, 10.3, 10.4, 10.5) have bores (41) provided in an area of the short sides, and the bores (41) are positioned for screw-fastening the bottom plates to the facing frame legs (31, 33) of the frame (30).

8. In a control cabinet in accordance with claim 6, wherein a nut element (38) with a securing shoulder (39) is insertable within a fastening receptacle (37) of the facing frame leg, and a tensioning bolt (40) screwed into the nut element (38) is supported on the bottom plate and clamps the bottom plate against the support shoulder (35).

9. In a control cabinet in accordance with claim 1, wherein the cutouts (11) are identical and are positioned at regular intervals in the bottom plate (10) into which a plurality of identical base plates (20) with the cable bushings (22) are insertable.

10. In a control cabinet in accordance with claim 1, wherein the cutouts (11.1, 11.2) are differently sized and are positioned in the bottom plate (10.1), and the differently sized cable bushings (22.1, 22.2, 22.3) are insertable within the cutouts (11.1, 11.2).

11. In a control cabinet in accordance with claim 1, wherein the cutouts (11, 11.1, 11.2) of all of the bottom plates (10, 10.1) are equipped with cable bushings (22, 22.1, 22.2, 22.3) in which a smallest bushing piece is closed.

12. In a control cabinet in accordance with claim 1, wherein the bottom plates (10, 10.1, 10.3, 10.4, 10.5) have bores (41) provided in an area of the short sides, and the bores (41) are positioned for screw-fastening the bottom plates to the facing frame legs (31, 33) of the frame (30).

13. In a control cabinet in accordance with claim 1, wherein a nut element (38) with a securing shoulder (39) is insertable within a fastening receptacle (37) of the facing frame leg, and a tensioning bolt (40) screwed into the nut element (38) is supported on the bottom plate and clamps the bottom plate against the support shoulder (35).

* * * * *